(12) United States Patent
Ding et al.

(10) Patent No.: US 9,697,353 B2
(45) Date of Patent: Jul. 4, 2017

(54) METHOD AND DEVICE FOR INTERCEPTING CALL FOR SERVICE BY APPLICATION

(71) Applicant: BEIJING QIHOO TECHNOLOGY COMPANY LIMITED, Beijing (CN)

(72) Inventors: Yi Ding, Beijing (CN); Yuan Li, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 14/405,846

(22) PCT Filed: May 30, 2013

(86) PCT No.: PCT/CN2013/076453
§ 371 (c)(1),
(2) Date: Dec. 5, 2014

(87) PCT Pub. No.: WO2013/182006
PCT Pub. Date: Dec. 12, 2013

(65) Prior Publication Data
US 2015/0169872 A1    Jun. 18, 2015

(30) Foreign Application Priority Data

Jun. 7, 2012    (CN) .......................... 2012 1 0187455

(51) Int. Cl.
*G06F 21/54* (2013.01)
*G06F 21/53* (2013.01)

(52) U.S. Cl.
CPC .............. *G06F 21/54* (2013.01); *G06F 21/53* (2013.01); *G06F 2221/033* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,065,734 B1 * | 11/2011 | Kennedy | ................ | G06F 21/53 713/164 |
| 8,209,757 B1 * | 6/2012 | Kennedy | ................ | G06F 21/53 713/164 |

(Continued)

OTHER PUBLICATIONS

International Search Report regarding PCT/CN2013/076453 issued Sep. 5, 2013, 2 pages.

(Continued)

*Primary Examiner* — Taghi Arani
*Assistant Examiner* — Phy Anh Vu
(74) *Attorney, Agent, or Firm* — Baker & Hostetler LLP

(57) ABSTRACT

Disclosed are a method and a device for intercepting a call for a service by an application in an operating system of an electronic apparatus. The method comprises: loading an interception dynamic link library to a process where the service is located; replacing the address of an input/output control function in the process with a first address of the interception dynamic link library; when the application is calling the service, executing the interception dynamic link library based on the first address so as to obtain the name and information of the application as well as the information of the call, and replacing the address of the service to be called comprised in the information of the call with a second address of the interception dynamic link library; and executing processing based on the second address according to the name and/or information of the application. The invention increases the security of the operating system of the electronic apparatus.

18 Claims, 3 Drawing Sheets

(56) References Cited

U.S. PATENT DOCUMENTS

| | | | |
|---|---|---|---|
| 2003/0055979 A1* | 3/2003 | Cooley | H04L 29/12066 709/227 |
| 2004/0003290 A1* | 1/2004 | Malcolm | H04L 63/029 726/14 |
| 2004/0059735 A1* | 3/2004 | Gold | G06F 11/2025 |
| 2005/0108562 A1* | 5/2005 | Khazan | G06F 11/3604 726/23 |
| 2005/0210139 A1* | 9/2005 | Hightower | H04L 29/12009 709/227 |
| 2007/0250927 A1* | 10/2007 | Naik | G06F 21/566 726/22 |
| 2008/0034418 A1* | 2/2008 | Venkatraman | H04L 63/0227 726/15 |
| 2009/0100172 A1* | 4/2009 | Chen | G06F 9/5061 709/224 |
| 2009/0126017 A1* | 5/2009 | Chahal | G06F 21/54 726/23 |
| 2012/0084791 A1* | 4/2012 | Benedek | G06F 13/14 719/313 |
| 2013/0239215 A1* | 9/2013 | Kaufman | G06F 21/566 726/24 |
| 2014/0059525 A1* | 2/2014 | Jawa | G06F 21/53 717/162 |
| 2014/0237594 A1* | 8/2014 | Thakadu | G06F 21/52 726/23 |

OTHER PUBLICATIONS

English translation of abstract only of Chinese application CN101493873 A, Title: Read-write operation access control method for WIN platform based on inner core layer technology, Publication Date: Jul. 29, 2009, Country: CN Inventor(s): Jin Zhang et al., one page.

English translation of abstract only of Chinese application CN101655892 A, Title: Mobile terminal and access control method, Publication Date: Feb. 24, 2010 Country: CN, Inventor(s): Jian Meng et al., one page.

English translation of abstract only of Chinese application CN101667235 A, Title: Method and device for protecting user privacy, Publication Date: Mar. 10, 2010, Country: CN, Inventor(s): Lu Bian, one page.

English translation of abstract only of Chinese application CN101997912 A, Title: Mandatory access control device based on Android platform and control method thereof, Publication Date: Mar. 30, 2011, Country: CN, Inventor(s): Feng Yang et al., one page.

English translation of abstract only of Chinese application CN102693394A, Title: Method and device for intercepting calling for service of application program, Publication Date: Sep. 26, 2012, Country: CN, Inventor(s): Yi Ding et al., one page.

Shi, Yong-Lin et al, English translation of Abstract only, Computer Knowledge and Technology, 2008, vol. 3, No. 9, pp. 1920-1922.

* cited by examiner

METHOD AND DEVICE FOR INTERCEPTING CALL FOR SERVICE BY APPLICATION

FIELD OF THE INVENTION

The invention relates to system security of an operating system of an electronic apparatus, and in particular, to a method and device for intercepting a call for a service by an application in an operating system of an electronic apparatus.

BACKGROUND OF THE INVENTION

Recently, electronic apparatuses, especially portable electronic apparatuses (e.g., mobile phones, tablet computers, etc.) installed with an operating system become increasingly popular. Correspondingly thereto, the number of applications running on the operating system of the electronic apparatuses also has an exponentially explosive growth. Taking iOS system and Android system as examples, the applications on the systems exceed 60,0000 and 40,0000 at present, respectively.

Although a huge number of applications bring about more options for a user, the attendant security issues are also worthy of attention. Taking Android system as an example, part important functions of the system are provided by way of a service interface, for example, contact information is read through a data source service (i.e., a process of the system which is loaded with an object of the data source service and provides an interface), and any program needing to read the contact information needs to apply to the service for reading the contact information via the interface.

The interface of such a service is based on the Binder communication mechanism, and the flow of calling the interface is as follows: an application issues an interface request for a service and sends the name of the service and the sequence number of the interface→a total service router queries about the service, registers the caller and lets it wait→the total service router assigns the request of a client to a particular service→the particular service performs a call for its own interface→the particular service returns the result of the call→the total service router gets the result and returns it to the registered application→the client program gets the result of the interface request.

At present, the Android system itself does not have a mechanism of interception, and just informs a user of the system that a program may access some services before the program is installed, but it does not judge whether an application program is a malicious program or not. Currently, there are some schemes which intercept malicious programs. For example, an interception is implemented by way of registering a false service to the system. However, such a way will leave an obvious false service name in the system where an interception is performed, which will be very easily found by a malicious program and cause the interception to fail.

SUMMARY OF THE INVENTION

In view of the above problems, the invention is proposed to provide a method and device for intercepting a call for a service by an application in an operating system of an electronic apparatus which overcome the above problems or at least in part solve or mitigate the above problems.

According to an aspect of the invention, providing a method for intercepting a call for a service by an application in an operating system of an electronic apparatus comprising: loading an interception dynamic link library to a process where the service is located; replacing the address of an input/output control function in the process with a first address of the interception dynamic link library; when the application is calling the service, executing the interception dynamic link library based on the first address so as to obtain the name and information of the application as well as the information of the call, and replacing the address of the service to be called comprised in the information of the call with a second address of the interception dynamic link library; and executing processing based on the second address according to the name and/or information of the application.

According to another aspect of the invention, providing a device for intercepting a call for a service by an application in an operating system of an electronic apparatus comprising: a loading module configured to load an interception dynamic link library to a process where the service is located; a first replacing module configured to replace the address of an input/output control function in the process with a first address of the interception dynamic link library; a second replacing module configured to, when the application is calling the service, execute the interception dynamic link library based on the first address so as to obtain the name and information of the application as well as the information of the call, and replace the address of the service to be called comprised in the information of the call with a second address of the interception dynamic link library; and a processing module configured to execute processing based on the second address according to the name and/or information of the application.

According to yet another aspect of the invention, there is provided a computer program comprising a computer readable code which causes a server to perform the method for intercepting a call for a service by an application in an operating system of an electronic apparatus, when said computer readable code is running on the server.

According to still another aspect of the invention, there is provided a computer readable medium storing the computer program.

The beneficial effects of the invention lie in that:

The invention is able to intercept a call when an application is performing the call for a service, and judge whether the application is a trusted application or a malicious application taking advantage of a white list, a black list and feature data in a predefined database. In the event that the information of the call and the application is inconsistent with the above information in the database, it may further display the name and information of the application as well as the information of the call, and thus it may be possible to select whether to allow the call for the service by the application according to such information. In case of, for example, a malicious application calling the service, it may be possible to directly refuse the call or select to refuse the call, and return a false service result of the call being successful, such that the malicious program can not find it, thereby increasing the security of the system.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

Figure 1:
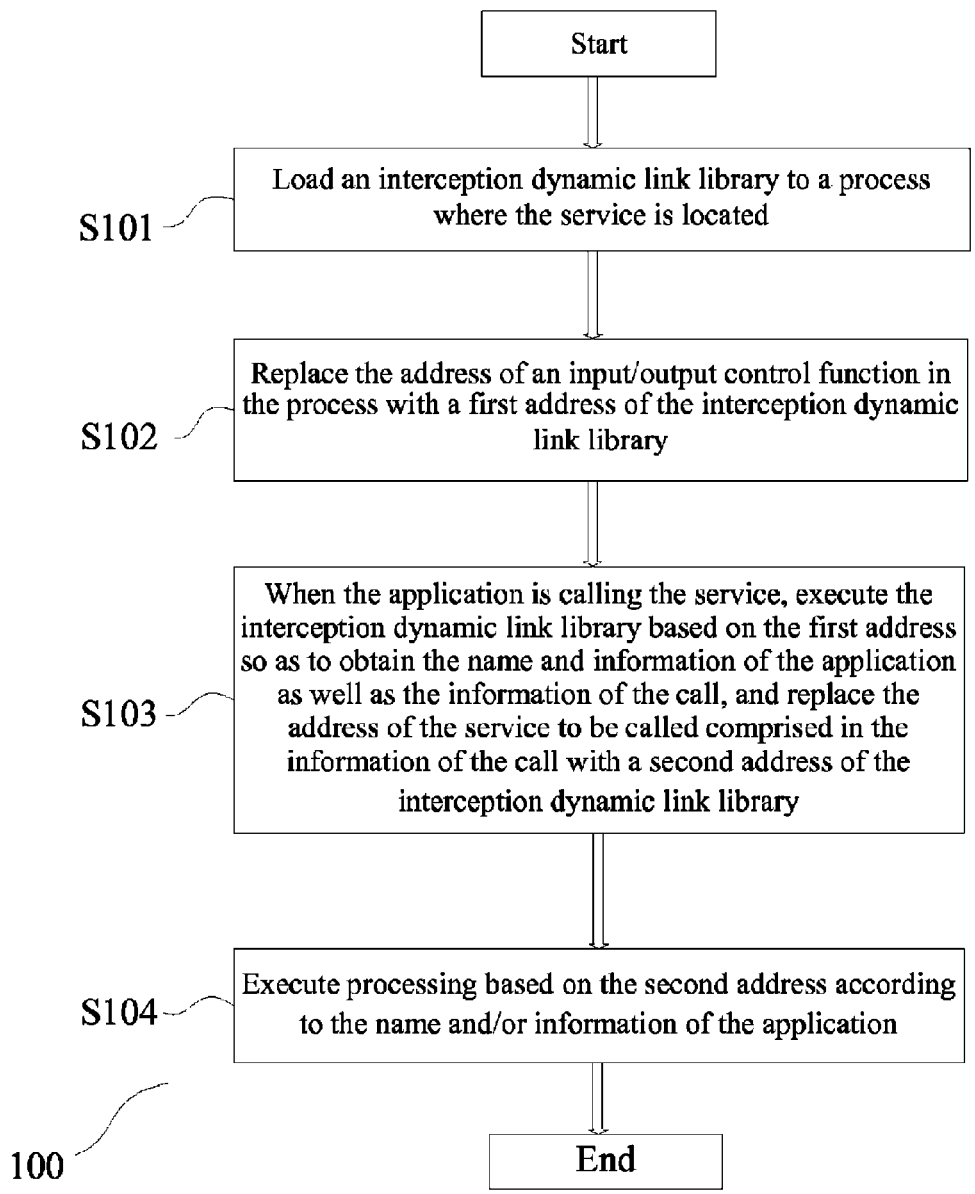
FIG. 1 shows schematically a flow chart of a method for intercepting a call for a service by an application in an operating system of an electronic apparatus according to an embodiment of the invention.

FIG. 1 is a flow chart of a method for intercepting a call for a service by an application in an operating system of an electronic apparatus according to an embodiment of the invention. According to the invention, the electronic apparatus comprises, but is not limited to, the following electronic apparatus installed with an operating system: a portable computing apparatus, such as a mobile phone, a tablet computer, a notebook computer, a navigator, an audio and/or video player, a radio, a mobile TV, multifunctional remote control, etc.; a stationary computing apparatus, such as a desktop computer, a mainframe computer, a printer, a facsimile machine, a photocopier, a multifunction printer, a set top box, a public information inquiry equipment, a multimedia information interaction equipment, etc.; and other electronic apparatuses installed with an operating system.

In the following, taking a mobile phone installed with the Android system as an example, the principle of the invention will be described exemplarily, however, such a description is just exemplary, the scope of the invention will not be limited thereto, and the principle of the invention may also apply to any electronic apparatus installed with other operating system (e.g., Linux, iOS, Window Phone, Symbian, etc.), e.g., those electronic apparatuses mentioned above.

In the method 100 for intercepting a call for a service by an application in an operating system of an electronic apparatus, that the application calls the service through the Binder mechanism of the Android system is taken as an example to be described hereinafter, however, such a description is just exemplary, and the invention also applies to other communication mechanisms.

According to the invention, processes where individual services are located are found in advance in the Android system. In step S101, an interception dynamic link library is loaded to a process where the service is located. According to an embodiment of the invention, for example, the interception dynamic link library may be loaded to a process where the service is located through the application programming interface (API) dlopen provided by the Linux system on which the Android system is based. According to an embodiment of the invention, before step S101 is executed, the process may be suspended, for example, the suspending operation may be implemented through the application programming interface ptrace provided by the Linux system.

After step S101, step S102 is executed, wherein the address of an input/output control function in the process is replaced with a first address of the interception dynamic link library. According to an embodiment of the invention, the input/output control function is the IOCTL function in the Binder mechanism. The first address of the interception dynamic link library is used for executing the interception dynamic link library. After step S102 is executed, the process may be resumed.

Next, in step S103, when the application is calling the service, the interception dynamic link library is executed based on the first address so as to obtain the name and information of the application as well as the information of the call, and the address of the service to be called comprised in the information of the call is replaced with a second address of the interception dynamic link library. According to an embodiment of the invention, when the application is calling the service through the Binder mechanism, it will reach the IOCTL function, and since the address of the IOCTL function has already been replaced with the first address of the interception dynamic link library, the interception dynamic link library will be executed based on the first address. At this point, the interception dynamic link library may obtain, via the IOCTL function, the name and information of the application as well as the information of the call ahead of the Android system.

According to an embodiment of the invention, the information of the call comprises the sequence number of the interface of the call and the address of the service to be called. The address of the service to be called is replaced with a second address of the interception dynamic link library, and then a processing may be performed based on the second address according to the name and/or information of the application.

Since the address of the service to be called has already been replaced with the second address of the interception dynamic link library, in step S104, processing is performed based on the second address according to the name and/or information of the application.

According to an embodiment of the invention, based on the second address, by comparing the name and/or information of the application with information in a predefined database, either (a) the call is executed according to the address of the service, and the actual service result is returned to the application, or (b) a predefined service result is returned to the application.

According to an embodiment of the invention, the predefined service result may be, for example, a service result indicating that the call has already been successful so as to cause the application to believe that the call for the service by it has already been succeeded, and be utterly ignorant of the interception performed according to an embodiment of the invention.

The predefined database may comprise a white list, a black list and feature data. The white list may comprise names of known trusted applications (including UIDs (Unique Identifiers) of programs and package names of programs), the black list may comprise the names of known malicious applications (including UIDs (Unique Identifiers) of programs and package names of programs), and the feature data may comprise data of known malicious features (e.g., advertisement features).

According to an embodiment of the invention, it may be that the name and the information of the application are respectively utilized to, or the both are combined to perform a judgment on the identity of the application, and in turn corresponding processing is taken.

In particular, when the name of the application is utilized to perform a judgment on the identity of the application: if the name of the application is comprised in the white list in the predefined database, the call is executed according to the address of the service, and the actual service result is returned to the application; or if the name of the application is comprised in the black list in the predefined database, a predefined service result is returned to the application; or if the name of the application is comprised neither in the white list nor in the black list in the predefined database, the name and information of the application as well as the information of the call are displayed, and processing is performed according to a selection with respect to the call via the operating system on the electronic apparatus.

That is, when the name of the application is comprised in the white list, the application is judged to be a trusted application, its call for the service is allowed, thereby the call is executed according to the address of the service, and the actual service result is returned to the application; when the name of the application is comprised in the black list, the application is judged to be a malicious application, its call for the service is refused, and a false service result is directly returned to it so as to cause it to believe that the call has already been succeeded; whereas when the name of the application is comprised neither in the white list, nor in the black list, the name and information of the application as well as the information of the call are displayed, and processing is performed according to a selection with respect to the call via the operating system on the electronic apparatus. In particular, in case of selecting to allow the application to call the service, the call is executed according to the address of the service, and the actual service result is returned to the application; or in case of selecting not to allow the application to call the service, a predefined service result is returned to the application. The selection with respect to the call as described above may for example be done by a user through the operating system of the electronic apparatus, after he sees the name and information of the application as well as the information of the call displayed on the display screen of the electronic apparatus.

Figure 2:
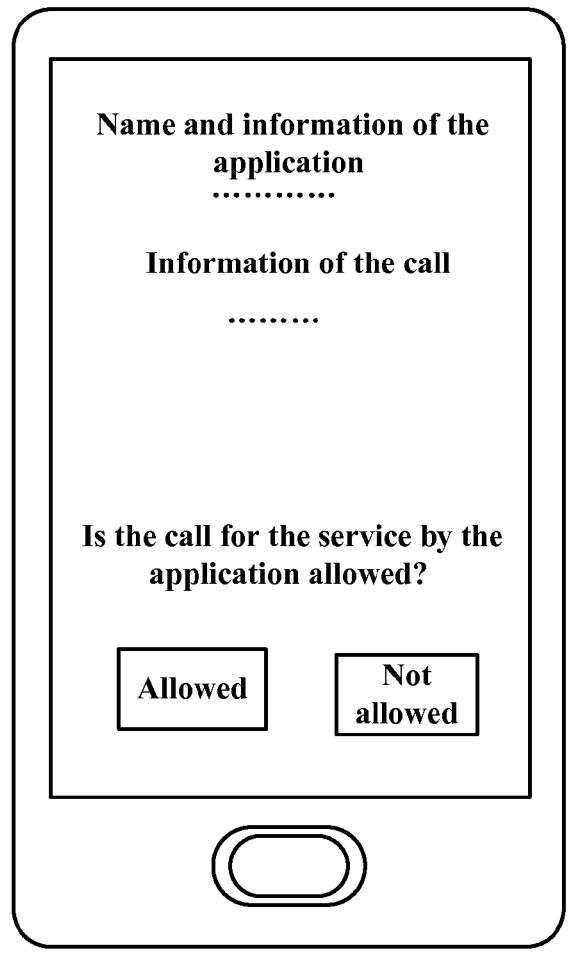
FIG. 2 shows schematically an exemplary view of performing a selection on a call on an electronic apparatus via an operating system according to an embodiment of the invention.

FIG. 2 is an exemplary view of performing a selection on a call on an electronic apparatus via an operating system according to an embodiment of the invention. Referring to FIG. 2, the name and information of the application as well as the information of the call are displayed on the display screen of a mobile phone, and a user is asked whether to allow the application to call the service. In the event that the user selects to allow the application to call the service, the call is executed according to the address of the service, and the actual service result is returned to the application; or in the event that the user selects not to allow the application to call the service, a predefined service result is returned to the application.

On the other hand, when the information of the application is utilized to perform a judgment on the identity of the application: if the information of the application comprises the feature data in the predefined database, a predefined service result is returned to the application; or if the information of the application does not comprise the feature data in the predefined database, the name and information of the application as well as the information of the call are displayed, and processing is performed according to a selection with respect to the call via the operating system on the electronic apparatus.

That is, when the information (e.g., package configuration information) of the application comprises the feature data (e.g., data of advertisement features), the application is judged to be a malicious application, its call for the service is refused, and a false service result is directly returned to it so as to cause it to believe that the call has been succeeded; whereas the information of the application does not comprise the feature data, the steps described above with reference to FIG. 2 are performed. In the event that the user selects to allow the application to call the service, the call is executed according to the address of the service, and the actual service result is returned to the application; or in the event that the user selects not to allow the application to call the service, a predefined false service result is directly returned to the application.

In the following, that a malicious application A initiates a request for sending an advertisement message to a notification bar is taken as an example to describe the principle of the invention, however, such a description is just exemplary, and the invention may be applied in intercepting any malicious applications.

According to an embodiment of the invention, a list control and display service is started, and processes (including a process where the notification bar service is located, of which the name is assumed to be the process S) where individual services are located are found in advance in the Android system, and the interception dynamic link library is loaded to processes (including the process S) where the individual services are located. In order to send an advertisement message to the notification bar, the malicious application A needs to call the notification bar service, and it will first initiate access to the interface of the notification bar.

According to an embodiment of the invention, the address of the IOCTL function in the Binder mechanism is replaced with a first address of the interception dynamic link library. Since the malicious application A would realize a call for the notification bar service via the Binder mechanism, it would execute the IOCTL function in the Binder mechanism. The IOCTL is already replaced with the first address, and thus the interception dynamic link library will be executed based on the first address. At this time, the interception dynamic link library may obtain, via the IOCTL function, the name and information (the malicious application A and its description) of the application as well as the information (calling the notification bar service, the title and content of the advertisement message to be displayed) of the call ahead of the Android system. Then, the address of the notification bar service is replaced with a second address of the interception dynamic link library.

Next, since the address of the notification bar service has already been replaced with the second address, the second address is based onto communicate with the list control and display service via the Binder mechanism, to judge whether the name of the malicious application A is comprised in a white list or black list in a predefined database, and/or to judge whether the information of the malicious application A comprises feature data in a predefined database. Since an advertisement feature is comprised in the package of the malicious application A, even if the name of the malicious application A is not comprised in the black list, it may be judged to be a malicious application, thereby its call for the notification bar service is refused, and a predefined service result is directly returned to it, i.e., a service result indicating that the call has already been succeeded, so as to cause the malicious application A to believe that its call for the notification bar service has already been succeeded, and be utterly ignorant of the interception performed according to an embodiment of the invention.

In an alternative embodiment, suppose that the name of the malicious application A is comprised neither in the white list nor in the black list in the predefined database, and the information of the malicious application A does not comprise the feature data in the predefined database, either. At this point, via the list control and display service, the name and information of the malicious application A as well as the information of the call may be displayed on the display screen of the electronic apparatus (e.g., displayed in a way as in FIG. 2, or displayed in the notification bar). In the event that the user selects to allow the malicious application A to call the notification bar service, the call is executed according to the address of the notification bar service, and the actual service result is returned to the malicious application A; or in the event that the user selects not to allow the malicious application A to call the notification bar service, a predefined false service result is directly returned to the malicious application A. Or, while the name and information of the malicious application A as well as the information of the call are displayed on the display screen of the electronic apparatus (e.g., displayed in a way as in FIG. 2, or displayed in the notification bar), the advertisement message to be sent by the malicious application A may be displayed directly in the notification bar, and the user may conduct setting after seeing the advertisement message, so as to add the malicious application A to the black list in the predefined database and add the advertisement message to the feature data in the predefined database, such that the malicious application A is directly intercepted in a subsequent system operation.

The invention provides a method for intercepting a call for a service by an application in an operating system of an electronic apparatus. The invention is able to intercept a call when an application is performing the call for a service, and judge whether the application is a trusted application or a malicious application taking advantage of a white list, a black list and feature data in a predefined database. In the event that the information of the call and the application is inconsistent with the above information in the database, it may further display the name and information of the application as well as the information of the call, and thus it may be possible to select whether to allow the call for the service by the application according to such information. In case of, for example, a malicious application calling the service, it may be possible to directly refuse the call or select to refuse the call, and return a false service result of the call being succeeded, such that the malicious program can not find it, thereby increasing the security of the system. In addition, information obtained by a user from a practical operation may further be added to the predefined database to improve the data in the database, such that a better effect will be obtained in a later interception.

According to the invention, it may be possible to intercept a behavior in which a malicious application snoops into private information (including contact information, phone call records, SMS, MMS, a variety of accounts and passwords) of a user of an electronic apparatus, prevent the malicious application from dialing a billing phone call, sending a billing SMS, and accessing a website which consumes the network traffic, prevent the malicious application from installing Trojan and virus programs, prevent the malicious application from recording a user's GPS or network positioning, and intercept the malicious application's popping up harassing advertisement information, etc., and any call for a service by any malicious application may be intercepted, thereby increasing the security of a system.

Figure 3:
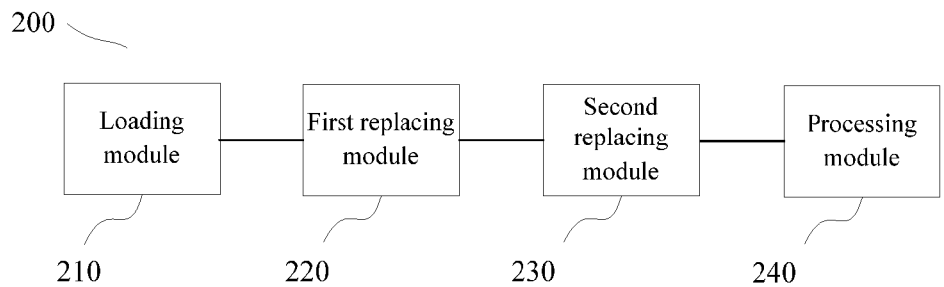
FIG. 3 shows schematically a block diagram of a device for intercepting a call for a service by an application in an operating system of an electronic apparatus according to an embodiment of the invention.

Correspondingly to the above method 100, the invention further provides a device 200 for intercepting a call for a service by an application in an operating system of an electronic apparatus; and referring to FIG. 3, the device 200 comprises:

a loading module 210 configured to load an interception dynamic link library to a process where the service is located, which loading module 210 may be configured to execute step S101 in the above method 100;

a first replacing module 220 configured to replace the address of an input/output control function in the process with a first address of the interception dynamic link library, which first replacing module 220 may be configured to execute step S102 in the above method 100;

a second replacing module 230 configured to, when the application is calling the service, execute the interception dynamic link library based on the first address so as to obtain the name and information of the application as well as the information of the call, and replace the address of the service to be called comprised in the information of the call with a second address of the interception dynamic link library, which second replacing module 230 may be configured to execute step S103 in the above method 100; and a processing module 240 configured to execute processing based on the second address according to the name and/or information of the application, which processing module 240 may be configured to execute step S104 in the above method 100.

In a preferred embodiment of the invention, the processing module 240 is configured to compare the name and/or information of the application with information in a predefined database, either (a) execute the call according to the address of the service, and return the actual service result to the application, or (b) return a predefined service result to the application.

In a preferred embodiment of the invention, when the name of the application is comprised in a white list in a predefined database, the processing module 240 executes the call according to the address of the service, and returns the actual service result to the application; or when the name of the application is comprised in a black list in the predefined database, the processing module 240 returns a predefined service result to the application; or when the name of the application is comprised neither in the white list nor in the black list in the predefined database, the processing module 240 displays the name and information of the application as well as the information of the call, and performs processing according to a selection with respect to the call via the operating system on the electronic apparatus.

In a preferred embodiment of the invention, when the information of the application comprises feature data in a predefined database, the processing module 240 returns a predefined service result to the application; or when the information of the application does not comprise the feature data in the predefined database, the processing module 240 displays the name and information of the application as well as the information of the call, and performs processing according to a selection with respect to the call via the operating system on the electronic apparatus.

In a preferred embodiment of the invention, in the event that the call for the service by the application is selected to be allowed, the processing module 240 executes the call according to the address of the service, and returns the actual service result to the application; or in the event that the call for the service by the application is selected not to be allowed, the processing module 240 returns the predefined service result to the application.

In a preferred embodiment of the invention, the device 200 further comprises a suspending module 250 configured to suspend the process before the loading module 210 loads the interception dynamic link library to the process where the service is located, and a resuming module 260 configured to resume the process after the first replacing module 220 replaces the address of the input/output control function in the process with the first address of the interception dynamic link library.

In a preferred embodiment of the invention, the information of the call comprises the sequence number of the interface of the call and the address of the service to be called.

In a preferred embodiment of the invention, the operating system is the Android system, and the application calls the service through the Binder mechanism of the Android system.

In a preferred embodiment of the invention, the input/output control function is the IOCTL function in the Binder mechanism.

In a preferred embodiment of the invention, when the application is calling the service, the second replacing module 230 executes the interception dynamic link library based on the first address, to obtain, via the IOCTL function, the name and information of the application as well as the information of the call ahead of the Android system.

Since the above individual embodiments of the device correspond to the above individual embodiments of the method, the individual embodiments of the device will not be described in detail any longer.

Embodiments of the individual components of the invention may be implemented in hardware, or in a software module running on one or more processors, or in a combination thereof. It will be appreciated by those skilled in the art that, in practice, some or all of the functions of some or all of the components in a device for intercepting a call for a service by an application in an operating system of an electronic apparatus according to individual embodiments of the invention may be realized using a microprocessor or a digital signal processor (DSP). The invention may also be implemented as an apparatus or device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 4:
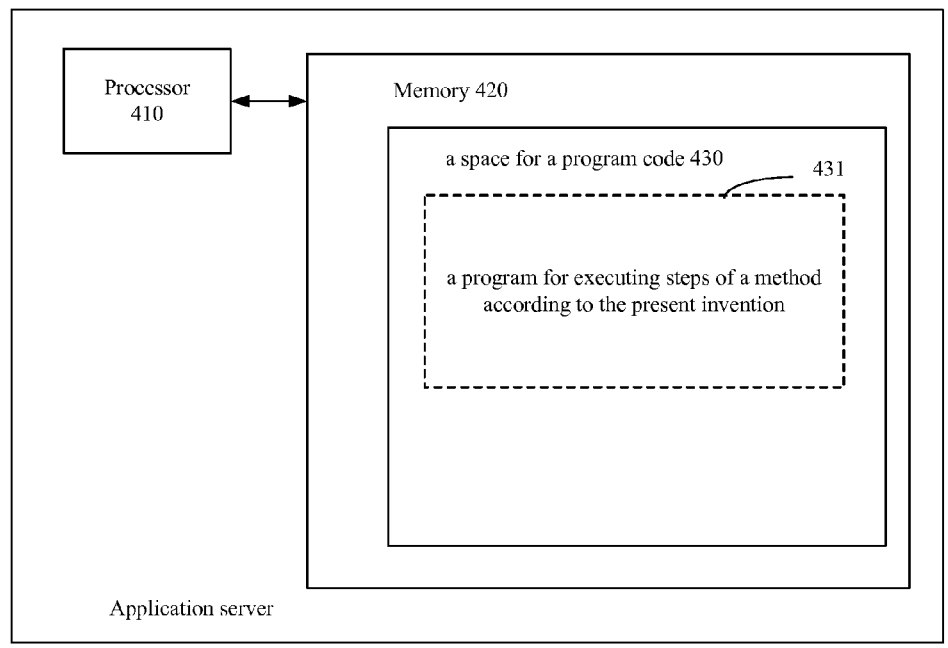
FIG. 4 shows schematically a block diagram of a server for performing a method according to the invention.
Figure 5:
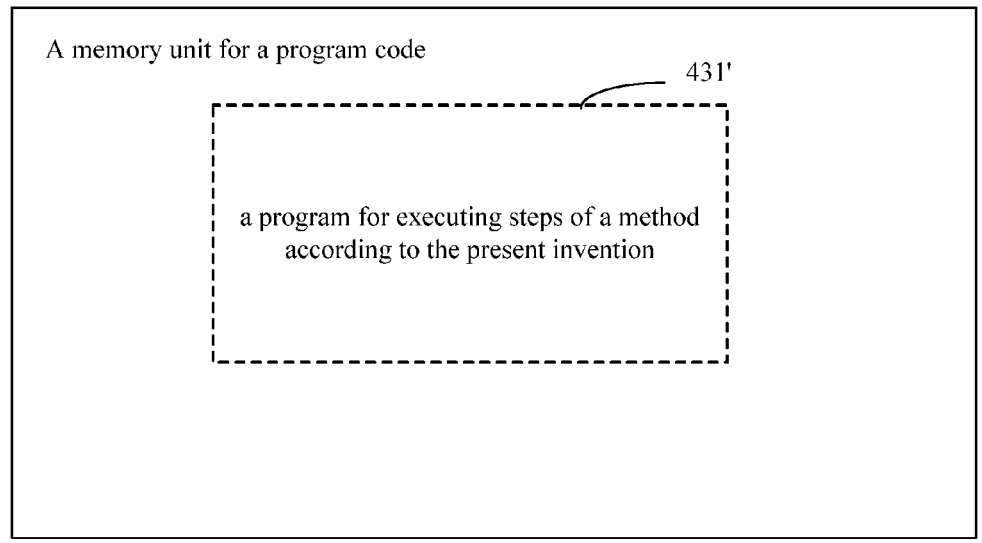
FIG. 5 shows schematically a storage unit for storing or carrying program codes implementing a method according to the invention.

For example, FIG. 4 shows a server which may carry out a method for intercepting a call for a service by an application in an operating system of an electronic apparatus according to the invention, e.g., an application server. The server traditionally comprises a processor 410 and a computer program product or a computer readable medium in the form of a memory 420. The memory 420 may be an electronic memory such as a flash memory, an EEPROM (electrically erasable programmable read-only memory), an EPROM, a hard disk or a ROM. The memory 420 has a memory space 430 for a program code 431 for carrying out any method steps in the methods as described above. For example, the memory space 430 for a program code may comprise individual program codes 431 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 5. The storage unit may have a memory segment, a memory space, etc. arranged similarly to the memory 420 in the server of FIG. 4. The program code may for example be compressed in an appropriate form. In general, the storage unit comprises a computer readable code 431', i.e., a code which may be read by e.g., a processor such as 410, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A method for intercepting a call for a service by an application among a plurality of applications running on an operating system of an electronic apparatus comprising:

loading, by at least one processor, an interception dynamic link library to a process where the service is located;

replacing, by the at least one processor, an address of an input/output control function in the process with a first address of the interception dynamic link library;

when the application is calling the service, executing, by the at least one processor, the interception dynamic link library based on the first address to obtain a name and information of the application and information of the call, and replacing an address of the service to be called included in the information of the call with a second address of the interception dynamic link library; and determining, by the at least one processor, the application to be malicious or not, and executing processing based on the second address according to at least one of the name and the information of the application, wherein the determining the application to be malicious or not and executing processing according to at least one of the name and the information of the application further comprises: comparing at least one of the name and the information of the application with information in a predefined database, and one of (a) executing the call according to the address of the service and returning an actual service result to the application, and (b) returning a predefined service result to the application.

2. The method as claimed in claim 1, wherein the determining the application to be malicious or not and executing processing according to the name of the application comprises one of: (a) when the name of the application is included in a white list in a predefined database, executing the call according to the address of the service, and returning an actual service result to the application, (b) when the name of the application is included in a black list in the predefined database, returning a predefined service result to the application, and (c) when the name of the application is not included in the white list or in the black list in the predefined database, displaying the name and the information of the application and the information of the call, and executing processing according to a selection with respect to the call via the operating system of the electronic apparatus.

3. The method as claimed in claim 2, wherein the determining the application to be malicious or not and executing processing according to the selection with respect to the call via the operating system on the electronic apparatus comprises one of: (a) in the event that the call for the service by the application is allowed, executing the call according to the address of the service and returning the actual service result to the application, and (b) in the event that the call for the service by the application is not allowed, returning the predefined service result to the application.

4. The method as claimed in claim 1, wherein the determining the application to be malicious or not and executing processing according to the name of the application comprises one of: (a) when the information of the application comprises feature data in a predefined database, returning a predefined service result to the application, and (b) when the information of the application does not comprise the feature data in the predefined database, displaying the name and the information of the application and the information of the call, and executing processing according to a selection with respect to the call via the operating system on the electronic apparatus.

5. The method as claimed in claim 4, wherein executing processing according to the selection with respect to the call via the operating system of the electronic apparatus comprises one of: (a) in the event that the call for the service by the application is allowed, executing the call according to the address of the service, and returning an actual service result to the application and (b) in the event that the call for the service by the application is not allowed, returning the predefined service result to the application.

6. The method as claimed in claim 1, further comprising: suspending the process before loading the interception dynamic link library to the process where the service is located and resuming the process after replacing the address of an input/output control function in the process with the first address of the interception dynamic link library.

7. The method as claimed in claim 1, wherein the information of the call comprises a sequence number of an interface of the call and the address of the service to be called.

8. The method as claimed in claim 1, wherein the operating system is an Android operating system, and the application calls the service through a Binder mechanism of the Android operating system.

9. The method as claimed in claim 8, wherein the input/output control function is an input/output control (IOCTL) function in the Binder mechanism.

10. The method as claimed in claim 9, wherein when the application is calling the service, executing the interception dynamic link library based on the first address, to obtain, via the IOCTL function, the name and the information of the application and the information of the call ahead of the Android operating system.

11. A device for intercepting a call for a service by an application among a plurality of applications running on an operating system of an electronic apparatus comprising:
a memory having instructions stored thereon; and
at least one processor configured to execute the instructions to perform operations for intercepting a call for a service by an application in an operating system of an electronic apparatus, the operations comprising:
loading an interception dynamic link library to a process where the service is located;
replacing an address of an input/output control function in the process with a first address of the interception dynamic link library;
when the application is calling the service, executing the interception dynamic link library based on the first address to obtain a name and information of the application and information of the call, and replacing an address of the service to be called included in the information of the call with a second address of the interception dynamic link library; and
determining the application to be malicious or not and executing processing based on the second address according to at least one of the name and the information of the application, wherein the determining the application to be malicious or not and executing processing according to at least one of the name and the information of the application comprises: comparing at least one of the name and the information of the application with information in a predefined database, and one of (a) executing the call according to the address of the service and returning an actual service result to the application, and (b) returning a predefined service result to the application.

12. The device as claimed in claim 11, wherein the operation of determining the application to be malicious or not and executing processing according to the name of the application comprises: (a) when the name of the application is included in a white list in a predefined database, executing the call according to the address of the service, and returning an actual service result to the application, or (b) when the name of the application is included in a black list in the predefined database, returning a predefined service result to the application, or (c) when the name of the application is not included in the white list or in the black list in the predefined database, displaying the name and the information of the application and the information of the call, and executing processing according to a selection with respect to the call via the operating system of the electronic apparatus.

13. The device as claimed in claim 12, wherein the operation of determining the application to be malicious or not and executing processing according to the selection with respect to the call via the operating system of the electronic apparatus comprises: (a) in the event that the call for the service by the application is allowed, executing the call according to the address of the service, and returning the actual service result to the application, or (b) in the event that the call for the service by the application is not allowed, returning the predefined service result to the application.

14. The device as claimed in claim 11, wherein the operation of determining the application to be malicious or not and executing processing according to the information of the application comprises: (a) returning a predefined service result to the application when the information of the application comprises feature data in a predefined database or (b) displaying the name and information of the application and the information of the call, and executing processing according to a selection with respect to the call via the operating system of the electronic apparatus when the information of the application does not comprise the feature data in the predefined database.

15. The device as claimed in claim 11, the operations further comprising: suspending the process before loading the interception dynamic link library to the process where the service is located and resuming the process after replacing the address of the input/output control function in the process with the first address of the interception dynamic link library.

16. The device as claimed in claim 11, wherein the information of the call comprises a sequence number of an interface of the call and the address of the service to be called.

17. The device as claimed in claim 11, wherein the operating system is an Android operating system, and the application calls the service through a Binder mechanism of the Android operating system.

18. A non-transitory computer readable medium having instructions stored thereon that, when executed by at least one processor, cause the at least one processor to perform operations for intercepting a call for a service by an application among a plurality of applications running on an operating system of an electronic apparatus comprising:
    loading an interception dynamic link library to a process where the service is located;
    replacing an address of an input/output control function in the process with a first address of the interception dynamic link library;
    when the application is calling the service, executing the interception dynamic link library based on the first address to obtain a name and information of the application and the information of the call, and replacing an address of the service to be called included in the information of the call with a second address of the interception dynamic link library; and
    determining the application to be malicious or not and executing processing based on the second address according to at least one of the name and the information of the application, wherein the determining the application to be malicious or not and executing processing according to at least one of the name and the information of the application further comprises: comparing at least one of the name and the information of the application with information in a predefined database, and one of (a) executing the call according to the address of the service and returning an actual service result to the application, and (b) returning a predefined service result to the application.

* * * * *